United States Patent
Foiera et al.

(10) Patent No.: US 12,055,301 B2
(45) Date of Patent: Aug. 6, 2024

(54) METHOD FOR PERFORMING A DRYING FUNCTION AFTER A COOKING FUNCTION OR STEAM COOKING FUNCTION

(71) Applicant: ELECTROLUX APPLIANCES AKTIEBOLAG, Stockholm (SE)

(72) Inventors: Riccardo Foiera, Forlì (IT); Giovanni Di Piano, Forlì (IT); Claudia Patella, Cotignola (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 505 days.

(21) Appl. No.: 17/413,615

(22) PCT Filed: Dec. 3, 2019

(86) PCT No.: PCT/EP2019/083447
§ 371 (c)(1),
(2) Date: Jun. 14, 2021

(87) PCT Pub. No.: WO2020/120221
PCT Pub. Date: Jun. 18, 2020

(65) Prior Publication Data
US 2022/0034518 A1    Feb. 3, 2022

(30) Foreign Application Priority Data
Dec. 14, 2018 (EP) ...................... 18212515

(51) Int. Cl.
*A21B 3/04* (2006.01)
*F24C 15/20* (2006.01)
*F26B 21/08* (2006.01)

(52) U.S. Cl.
CPC .......... *F24C 15/2021* (2013.01); *F26B 21/08* (2013.01)

(58) Field of Classification Search
CPC ...... F24C 15/20; F24C 15/2021; F26B 21/08; F26B 21/086; A23N 12/06; A21B 3/04; A23L 5/21
See application file for complete search history.

(56) References Cited

U.S. PATENT DOCUMENTS

| | | | | |
|---|---|---|---|---|
| 5,083,505 A | * | 1/1992 | Kohlstrung | A21B 3/04 126/369 |
| 6,197,358 B1 | * | 3/2001 | Bunker | A23L 19/15 426/639 |

(Continued)

FOREIGN PATENT DOCUMENTS

| | | | | |
|---|---|---|---|---|
| CH | 696039 | | 11/2006 | |
| DE | 102013214848 A1 | * | 2/2015 | ............... A21B 3/04 |

(Continued)

OTHER PUBLICATIONS

International Search Report and Written Opinion for PCT/EP2019/083447, dated Jan. 27, 2020, 7 pages.

*Primary Examiner* — Gregory A Wilson
(74) *Attorney, Agent, or Firm* — Pearne & Gordon LLP

(57) ABSTRACT

The present invention relates to a method for performing a drying function after a cooking function, in particular after a steam cooking function, wherein said method comprises the steps of: running the cooking function or steam cooking function (12) for a predetermined time or being manually finished by the user, detecting and/or calculating (16; 26) at least one parameter value (Y; H; $t_e$) after the cooking function or steam cooking function has been finished, comparing (18; 28) the detected and/or calculated parameter value (Y; H; $t_e$) with a corresponding threshold parameter value (Yth; Hth; $t_e$th), checking, if the drying function is required, and running the drying function (22) if required.

15 Claims, 5 Drawing Sheets

(56) References Cited

U.S. PATENT DOCUMENTS

Figure 1:
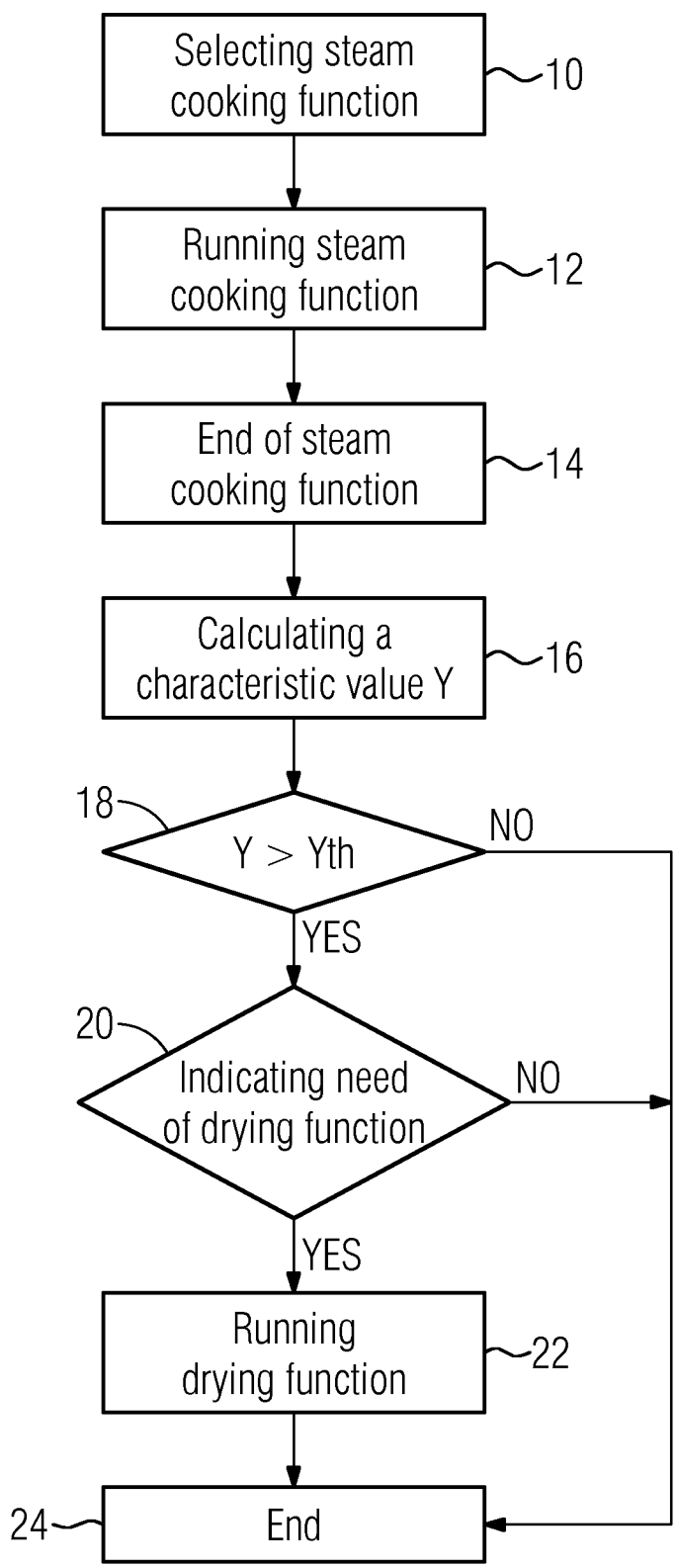

| | | | | |
|---|---|---|---|---|
| 7,634,992 B2* | 12/2009 | Bujeau | ............... | F24C 15/008 |
| | | | | 126/21 R |
| 8,993,934 B2* | 3/2015 | Giazzon | ............... | F24C 15/327 |
| | | | | 219/400 |
| 10,852,005 B2* | 12/2020 | Faraldi | ............... | F24C 15/2007 |
| 2007/0000905 A1* | 1/2007 | Imgram | ............... | A21B 3/04 |
| | | | | 219/401 |
| 2016/0174574 A1* | 6/2016 | Deming | ............... | F24C 15/322 |
| | | | | 426/523 |
| 2016/0238260 A1* | 8/2016 | Kayihan | ............... | F24C 15/003 |

FOREIGN PATENT DOCUMENTS

| | | | | |
|---|---|---|---|---|
| DE | 102016215647 | | 2/2018 | |
| DE | 102016215647 A1 * | 2/2018 | ............ | A47J 27/004 |
| EP | 3437477 B1 * | 3/2020 | ............ | A21B 3/04 |
| JP | 2017026214 | | 2/2017 | |
| JP | 2017026214 A * | 2/2017 | | |
| WO | 2018033385 | | 2/2018 | |

\* cited by examiner

METHOD FOR PERFORMING A DRYING FUNCTION AFTER A COOKING FUNCTION OR STEAM COOKING FUNCTION

The present invention relates to a method for performing a drying function after a cooking function, in particular after a steam cooking function. Further, the present invention relates to a cooking oven, in particular a cooking oven with at least one steam cooking function.

During a steam cooking process condensate is generated inside the oven cavity. Said condensate is annoying for the user and may by disadvantageous for the cooking process. After the cooking process the condensate must to be removed.

It is an object of the present invention to provide a method for performing a drying function after a cooking function or steam cooking function, wherein said drying function is adapted to the remaining humidity in the oven cavity by minimum energy consumption.

According to the present invention a method for performing a drying function after a cooking function, in particular after a steam cooking function, is provided, wherein said method comprises the steps of:
- running the cooking function or steam cooking function for a predetermined time or being manually finished by the user,
- detecting and/or calculating at least one parameter value after the cooking function or steam cooking function has been finished,
- comparing the detected and/or calculated parameter value with a corresponding threshold parameter value,
- checking, if the drying function is required, and
- running the drying function if required.

The main idea of the present invention is that the drying function is activated only if necessary, wherein the necessity is checked by using at least one parameter value. The drying function is immediately started, after the cooking function or steam cooking function has been finished. This allows an optimal adaption of the drying function to the requirements by minimum energy consumption. The method of the present invention is suitable for cooking ovens with and without steam functions. The method of the present invention may be also applied to cooking ovens with radiant heating, convection heat and even microwave heating functions.

For example, if the drying function is required, then the need of said drying function is indicated on a user interface and/or said drying function is started automatically. For example, the need of the drying function is indicated on the user interface by showing a pop-up interacting with the user. The drying function may be started or not by user interaction. The drying function could be started manually or automatically at the end of the cooking process, in particular at the end of the steam cooking process.

Further, the drying function may be finished either after a predetermined time or if the detected or calculated parameter value falls below a corresponding threshold parameter value.

According to a first embodiment of the present invention, after the cooking function or steam cooking function a characteristic value is calculated by the formula $$Y(SF,t,T) = t \cdot k1(SF) + T \cdot k2(SF),$$

wherein SF is a selected cooking function or steam cooking function, t is the time said cooking function or steam cooking function was running, T is the temperature during the cooking function or steam cooking function, k1 and k2 are coefficients depending on the selected cooking function or steam cooking function. For example, if the cooking oven is a microwave oven, then the coefficient k1 depends on the power of said microwave oven. The weight of the selected cooking function SF or steam cooking function SF depends on the amount of steam and/or humidity generated for said function and/or on the condensation expected at the end of the cooking process. The amount of steam depends on the number of activations of the steam generator, on which heating elements are activated and/or on the food inserted into the oven cavity.

Then, the characteristic value may be compared with a corresponding threshold characteristic value, wherein said threshold characteristic value is a function of the selected steam function SF, the time t said cooking function or steam cooking function was running and the temperature T during the cooking function or steam cooking function.

Particularly, the drying function is required and started manually or automatically, if the characteristic value exceeds the threshold characteristic value, and is finished, if the characteristic value falls below the threshold characteristic value.

According to a second embodiment of the present invention, the humidity inside the oven cavity is detected after the end of the cooking function or steam cooking function.

For example, if the detected humidity exceeds a threshold humidity value, then the drying function is required and started manually or automatically.

Moreover, the humidity inside the oven cavity may be detected during the drying function, wherein said drying function is continued, if the detected humidity exceeds the threshold humidity value, while said drying function is finished, if the detected humidity falls below the threshold humidity value.

According to a third embodiment of the present invention, an estimated run time $t_e$ for the drying function is calculated after the cooking function or steam cooking function by the formula $$t_e = \int_A^B H(t)dt/k,$$

wherein A is the start of the cooking function or steam cooking function, B is the end of the cooking function or steam cooking function and k is a humidity factor of the cooking function or steam cooking function.

Additionally, an adjusted estimated run time for the drying function may be calculated during the drying function by the formula $$t'_e = t_e - \int_C^D H(t)dt/k',$$

wherein C is the start of the drying function, D is the end of the drying function and k' is a drying factor of the drying function.

Further, the present invention relates to a cooking, in particular a cooking oven with at least one steam cooking function, wherein the cooking oven is provided for the method mentioned above.

Novel and inventive features of the present invention are set forth in the appended claims.

Figure 2:
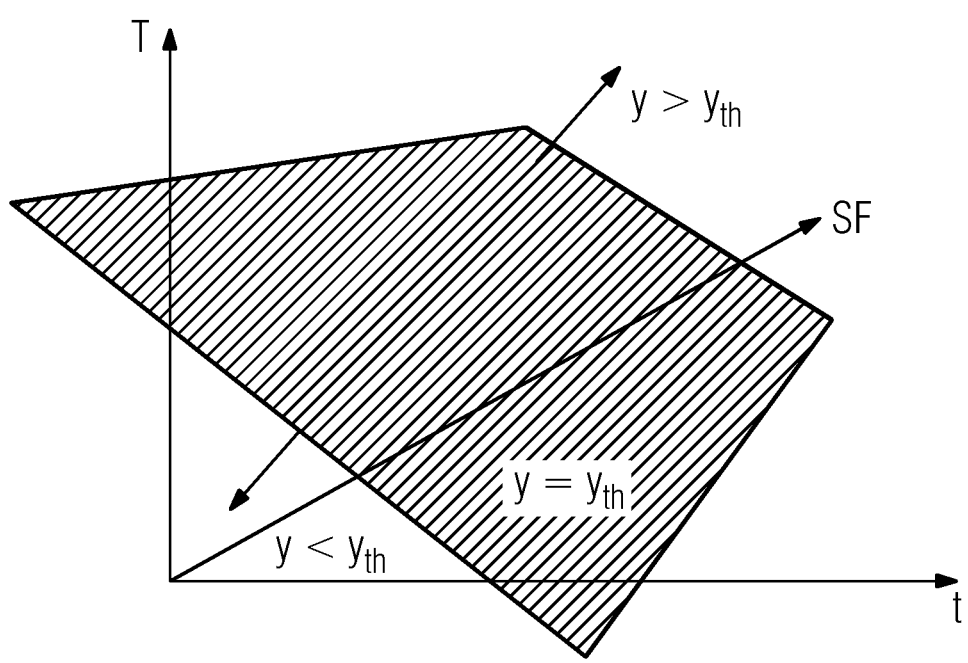
Figure 3:
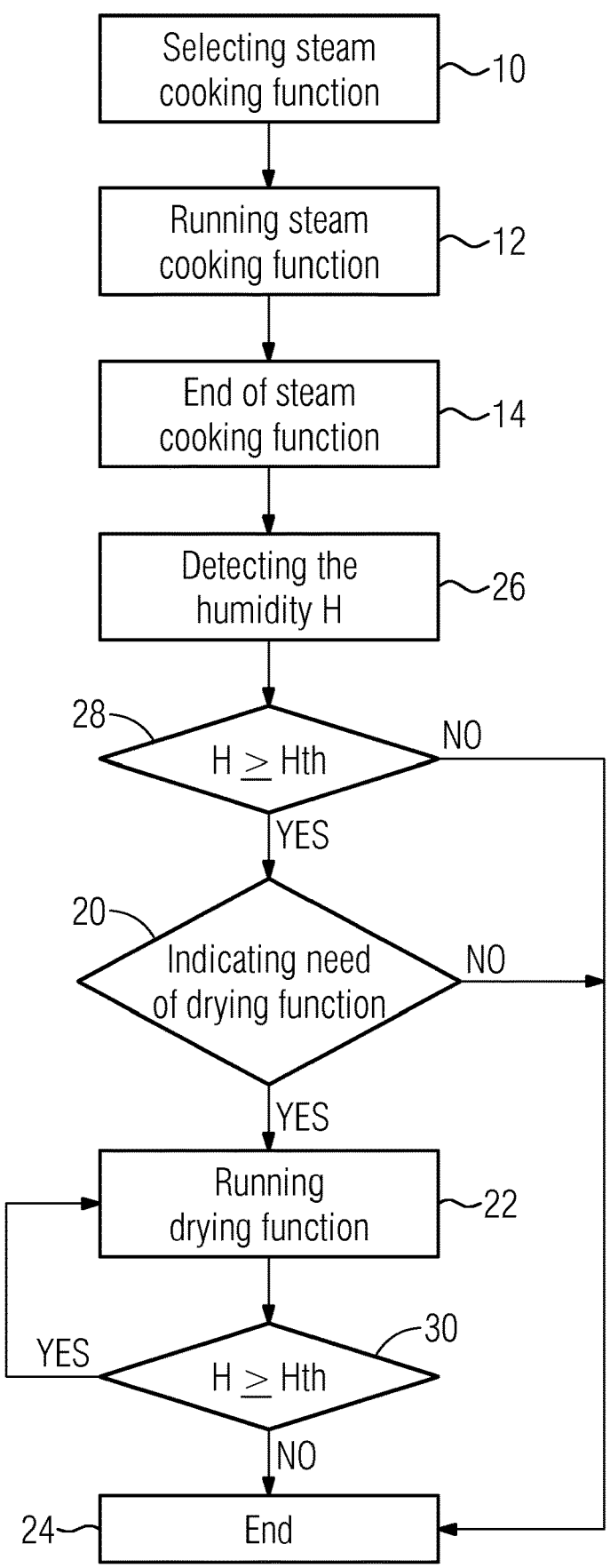
Figure 4:
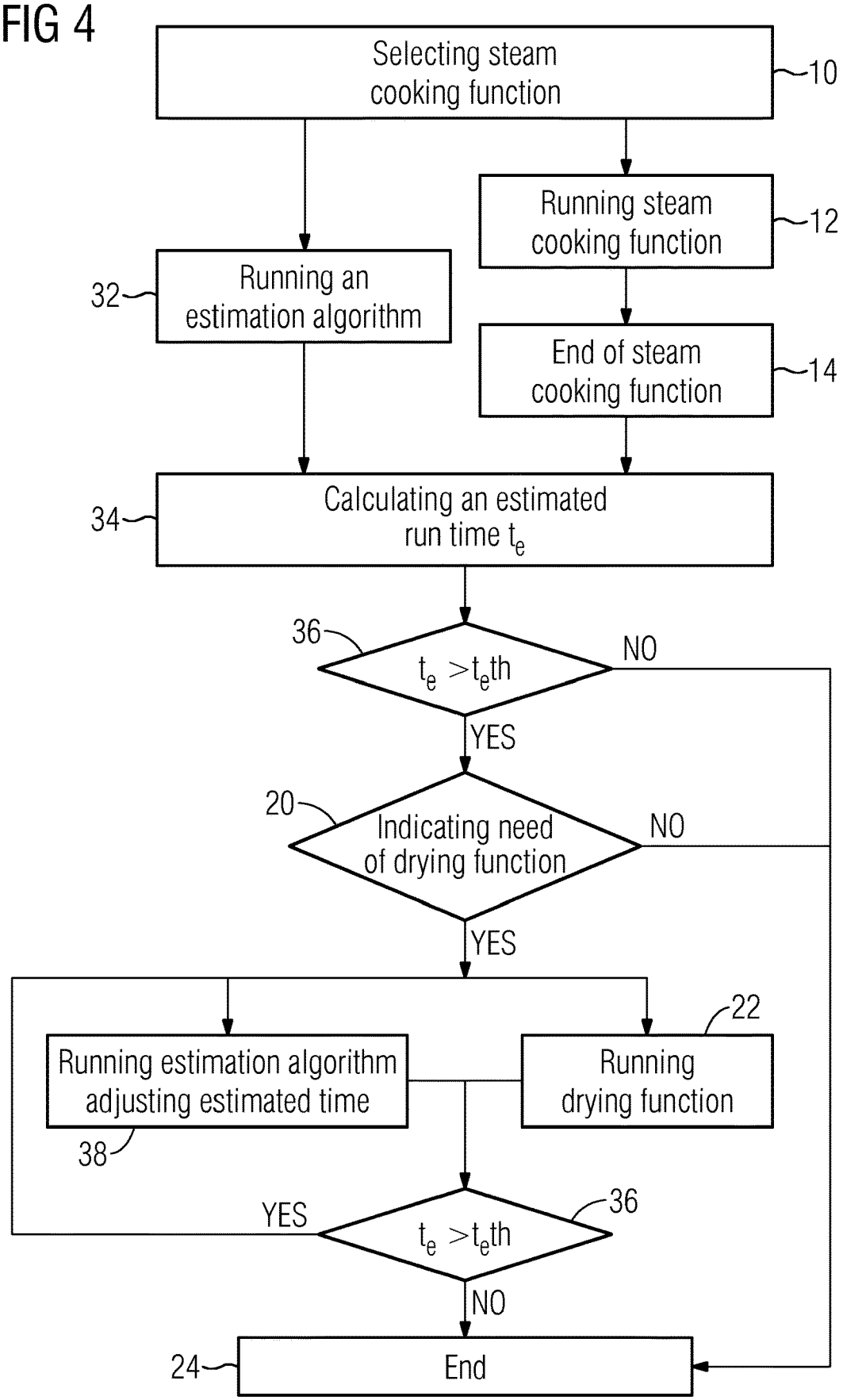
Figure 5:
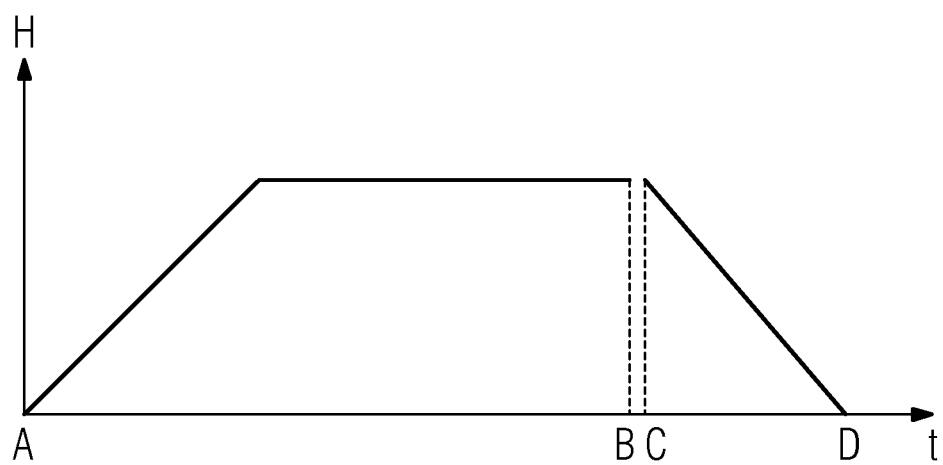

The present invention will be described in further detail with reference to the drawings, in which FIG. 1 illustrates a schematic flow chart diagram of a method for determining a condensation in an oven cavity according to a first embodiment of the present invention, FIG. 2 illustrates a schematic graphical representation of a characteristic value Y as function of a selected steam function SF, the time t and the temperature T according to the first embodiment of the present invention, FIG. 3 illustrates a schematic flow chart diagram of the method for determining the condensation in the oven cavity according to a second embodiment of the present invention, FIG. 4 illustrates a schematic flow chart diagram of the method for determining the condensation in the oven cavity according to a third embodiment of the present invention, and FIG. 5 illustrates a schematic diagram of the humidity inside the oven cavity as function of the time t during a steam cooking function and a drying function according to the third embodiment of the present invention.

FIG. 1 illustrates a schematic flow chart diagram of a method for determining a condensation in an oven cavity according to a first embodiment of the present invention.

In a first step 10 a steam cooking function is selected. In a next step 12 said steam cooking function is running. In a further step 14 the steam cooking function is ended either automatically by a timer or manually by a user.

In a step 16 a characteristic value Y is calculated by the formula $$Y(SF, t, T) = t \cdot k1(SF) + T \cdot k2(SF),$$

wherein SF is the selected steam function, t is the time said steam function was running, T is the temperature during the steam function, k1 and k2 are coefficients depending on the selected steam function. The coefficients k1 and k2 may be different or identical. For example, if the cooking oven is a microwave oven, then the coefficient k1 depends on the power of said microwave oven.

In a next step 18 the calculated characteristic value Y is compared with a threshold characteristic value Yth. If the characteristic value Y exceeds the threshold characteristic value Yth, then an acoustic and/or optical signal is indicated by a user interface in a step 20 in order to inform the user that a drying function is required. Alternatively, the drying function is automatically started, if the calculated value Y exceeds the threshold characteristic value Yth. Said drying function is provided for removing the condensate from the oven cavity.

In a further step 22 the drying function is running for a predetermined time. After the drying function has been ended, the method ends in a last step 24.

However, if the characteristic value Y falls below the threshold characteristic value Yth in the step 18, then the method is ended in the last step 24.

FIG. 2 illustrates a schematic graphical representation of the characteristic value Y as function of the selected steam function SF, the time t and the temperature T according to the first embodiment of the present invention.

The selected steam function SF, the time t and the temperature T form three cartesian variables of a three-dimensional space. The threshold characteristic value Yth is represented by a plane surface in said three-dimensional space. In general, the threshold characteristic value Yth may be represented by an arbitrary surface in the three-dimensional space.

The characteristic value Y exceeding the threshold value Yth form a half-space above the surface of the threshold characteristic value Yth, while the characteristic value Y falling below the threshold characteristic value Yth form the half-space beneath the surface of the threshold characteristic value Yth.

FIG. 3 illustrates a schematic flow chart diagram of the method for determining the condensation in the oven cavity according to a second embodiment of the present invention.

In the first step 10 the steam cooking function is selected. In the next step 12 said steam cooking function is running. In the further step 14 the steam cooking function is ended either automatically by the timer or manually by the user.

In a step 26 the humidity H in the oven cavity is detected. In a next step 28 the detected humidity H is compared with a thresh old humidity value Hth. If the humidity value H exceeds the threshold humidity value Hth, then the acoustic and/or optical signal is indicated by the user interface in the step 20 in order to inform the user that the drying function is required. Alternatively, the drying function is automatically started, if the calculated value Y exceeds the threshold characteristic value Yth. Said drying function is provided for removing the condensate from the oven cavity.

In the next step 22 the drying function is running. During the step 22 the humidity H in the oven cavity is detected continuously or at certain times. In a further step 30 the detected humidity H is compared with the threshold humidity value Hth. If the humidity value H exceeds the threshold humidity value Hth, then the drying function is continued in the step 22. If the humidity value H falls below the threshold humidity value Hth, then the method is ended in the last step 24.

FIG. 4 illustrates a schematic flow chart diagram of the method for determining the condensation in the oven cavity according to a third embodiment of the present invention.

In the first step 10 the steam cooking function is selected. In the next step 12 said steam cooking function is running. At the same time an estimation algorithm is running in a step 32. In the further step 14 the steam cooking function is ended either automatically by the timer or manually by the user. From the estimation algorithm of step 32 an estimated run time $t_e$ for the drying function is calculated in a step 34.

In this embodiment the detected humidity H is used to calculate the estimated run time $t_e$ for the drying function. The estimated run time $t_e$ is compared with a threshold value $t_e th$, wherein the decision if the drying function is running or not depends on said comparison.

In a step 36 the estimated run time $t_e$ is compared with the corresponding threshold value $t_e th$. If the estimated run time $t_e$ exceeds the threshold value $t_e th$, then the acoustic and/or optical signal is indicated by the user interface in the step 20 in order to inform the user that the drying function is required. The user may decide to start the drying function. Alternatively, the drying function is automatically started, if the estimated run time $t_e$ exceeds the threshold value $t_e th$. Said drying function is provided for removing the condensate from the oven cavity.

In the next step 22 the drying function is running. During the step 22 the estimation algorithm is running and the estimated run time $t_e$ is adjusted in a step 38. Then, the step 36 is repeated, wherein the estimated run time $t_e$ is compared with the corresponding threshold value $t_e th$ again. If the estimated run time $t_e$ exceeds the threshold value $t_e th$, then the drying function is continued in the step 22, wherein the estimation algorithm is running and the estimated run time $t_e$ is adjusted in the step 38. If the estimated run time $t_e$ falls below the threshold value $t_e th$, then the method is ended in the last step 24.

The estimated run time $t_e$ from the step 34 is checked at step 36. If the remaining estimated run time $t_e$ is bigger than zero, then an adjusted estimated run time $t'_e$ is calculated in the step 38.

FIG. 5 illustrates a schematic diagram of the humidity inside the oven cavity as function of the time t during a steam cooking function and a drying function according to the third embodiment of the present invention.

The steam cooking function is started at t=A and is finished at t=B. The drying function is started after the steam cooking function at t=C and is finished at t=D. In this schematic example, the humidity H increases linearly in the beginning of the steam cooking function, is constant during the remaining steam cooking function and decreases linearly during the drying function. However, the real steam cooking function and drying function are more complex, so that the humidity H may increase arbitrarily in the beginning of the steam cooking function, may fluctuate during the remaining steam cooking function and may decrease in an arbitrary way during the drying function.

The estimated run time $t_e$ for the drying function is calculated in the step 34 in FIG. 4 by the formula $$t_e = {}_A\int^B H(t)dt/k,$$

wherein k is a humidity factor of the steam cooking function. The humidity factor k represents the quantity of the humidity generated during the steam cooking function per second. The estimated time te is a preliminary value for the duration of the drying function.

The adjusted estimated run time t'e is given by the formula $$t'_e = t_e - {}_C\int^D H(t)dt/k',$$

wherein k' is a drying factor of the drying function and represent the quantity of the humidity dried during the drying function per second. The adjusted estimated time $t'_e$ is an actual value for the duration of the drying function.

Optionally, the adjusted estimated run time is stored for further steam cooking and drying functions.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 step of selecting a steam cooking function
12 step of running the steam cooking function
14 step of ending the steam cooking function
16 step of calculating a characteristic value
18 step of comparing the characteristic value with a threshold characteristic value
20 step of indication the need of a drying function
22 step of running the drying function
24 step of ending the method
26 step of detecting the humidity
28 step of comparing the detected humidity with a threshold humidity value
30 step of comparing the detected humidity with a threshold humidity value during the drying function
32 step of running an estimation algorithm
34 step of calculating the estimated run time for the drying function
36 step of comparing the estimated run time with a threshold value
38 step of running the estimation algorithm and adjusting the estimated run time
t time
T temperature
SF selected steam function
Y characteristic value
Yth threshold characteristic value
H humidity
Hth threshold humidity value
k1 first coefficient
k2 second coefficient
A start of steam cooking function
B end of steam cooking function
C start of drying function
D end of drying function
k humidity factor
k' drying factor
$t_e$ estimated run time for drying function
$t_e$th threshold value for the estimated run time
$t'_e$ adjusted estimated run time for drying function

The invention claimed is:

1. A method for performing a drying function after a cooking function in an oven cavity, comprising:
running the cooking function for a predetermined time or being manually finished by a user,
detecting and/or calculating at least one parameter value after the cooking function has been finished,
comparing the detected and/or calculated parameter value with a corresponding threshold parameter value,
checking if a drying function is required, and
running the drying function if required,
wherein after the cooking function a characteristic value (Y) of said at least one parameter value is calculated by the formula $$Y(SF,t,T) = t \cdot k1(SF) + T \cdot k2(SF), \text{ and}$$

wherein SF is a selected said cooking function, t is a time said selected cooking function was running, T is a temperature during the selected cooking function, and k1 and k2 are coefficients depending on the selected cooking function.

2. The method according to claim 1, wherein if the drying function is required, then a need of said drying function is indicated on a user interface and/or said drying function is started automatically.

3. The method according to claim 2, wherein the user interface asks if the drying function should be started manually or automatically if the drying function is required.

4. The method according to claim 1, wherein the drying function is finished either after a predetermined time or if the detected or calculated parameter value falls below a corresponding threshold parameter value.

5. The operating device according to claim 1, wherein the characteristic value (Y) is compared with a corresponding threshold characteristic value (Yth), wherein said threshold characteristic value (Yth) is a function of the selected cooking function, the time (t) said steam function was running and the temperature (T) during the steam function.

6. The operating device according to the claim 1, wherein the drying function is required and started manually or automatically if the characteristic value (Y) exceeds the threshold characteristic value (Yth), and is finished if the characteristic value (Y) falls below the threshold characteristic value (Yth).

7. A cooking oven with at least one steam cooking function, wherein the cooking oven is adapted to perform the method according to claim 1.

8. The method according to claim 1, said selected cooking function being a steam cooking function.

9. A method for performing a drying function after a cooking function in an oven cavity, comprising:
running the cooking function for a predetermined time or being manually finished by a user, detecting and/or calculating at least one parameter value after the cooking function has been finished,
comparing the detected and/or calculated parameter value with a corresponding threshold parameter value,
checking if a drying function is required, and
running the drying function if required,
wherein a humidity inside the oven cavity is detected after the end of the cooking function,
wherein an estimated run time ($t_e$) for the drying function is calculated after the cooking function by the formula $$t_e = {}_A\int^B H(t)dt/k, \text{ and}$$

wherein A is a start of the cooking function, B is an end of the cooking function, H(t) is humidity as a function of time during the cooking function, and k is a humidity factor of the cooking function.

10. The operating device according to claim 9, wherein if the detected humidity exceeds a threshold humidity value, then the drying function is required and started manually or automatically.

11. The operating device according to claim 10, wherein the humidity inside the oven cavity is detected during the drying function, wherein said drying function is continued if the detected humidity exceeds the threshold humidity value, while said drying function is finished if the detected humidity falls below the threshold humidity value.

12. The method according to claim 9, wherein an adjusted estimated run time (t'e) for the drying function is calculated during the drying function by the formula $$t'_e = t_e - {}_C\int^D H(t)dt/k',$$

wherein C is a start of the drying function, D is an end of the drying function and k' is a drying factor of the drying function.

13. A method for performing a drying function after a cooking function in an oven cavity, comprising:
running a selected cooking function from a group of available cooking functions to cook food in the oven cavity;
upon conclusion of the selected cooking function, detecting or calculating a parameter value characteristic of the selected cooking function, said parameter value being selected from the group consisting of:
an empirical value (Y) determined as a function of a time (t) of the selected cooking function, a temperature (T) of the selected cooking function, a first coefficient (k1) representative of the selected cooking function and a second coefficient (k2) representative of the selected cooking function,
a humidity value (H) of the selected cooking function, and
an estimated run time ($t_e$) for the drying function suited to the selected cooking function, which is determined as a function of humidity detected in the oven cavity during the selected cooking function;
comparing the detected or calculated characteristic parameter value with a threshold parameter value and:
if the detected or calculated characteristic parameter value initially exceeds said threshold parameter value, then providing an indication via a user interface that the drying function is required and/or automatically initiating said drying function, wherein the characteristic parameter value continues to be detected or calculated during said drying function, and wherein the drying function is terminated once said characteristic parameter value falls below the threshold parameter value,
if the detected or calculated characteristic parameter value does not initially exceed said threshold parameter value, then no such indication is provided and the drying function is not initiated.

14. The method according to claim 13, wherein with respect to said characteristic parameter value:
said empirical value (Y) being calculated by the formula:

$$Y(SF,t,T) = t \cdot k1(SF) + T \cdot k2(SF),$$

wherein SF is the selected cooking function, t is the time said selected cooking function was running, T is the temperature during the selected cooking function, and k1 and k2 are coefficients depending on the selected cooking function;
said humidity value (H) being a measured humidity within the oven cavity at the conclusion of said selected cooking function;
said estimated run time ($t_e$) for the drying function being calculated by the formula $$t_e = {}_A\int^B H(t)dt/k,$$

wherein A is a start of the selected cooking function, B is an end of the selected cooking function, H(t) is humidity as a function of time during the selected cooking function, and k is a humidity factor of the selected cooking function.

15. The method according to claim 14, wherein in case the characteristic parameter value is the estimated run time (te) for the drying function suited to the selected cooking function, then the threshold parameter value is an adjusted estimated run time (t'e) calculated by the formula:

$$t'_e = t_e - {}_C\int^D H'(t)dt/k',$$

wherein C is a start of the drying function, D is an end of the drying function, H'(t) is humidity as a function of time during the drying function and k' is a drying factor of the drying function representative of a quantity of humidity in the cooking cavity dried during the drying function per second.

* * * * *